US010523447B2

(12) United States Patent
Yang

(10) Patent No.: US 10,523,447 B2
(45) Date of Patent: Dec. 31, 2019

(54) OBTAINING AND USING TIME INFORMATION ON A SECURE ELEMENT (SE)

(71) Applicant: Apple Inc., Cupertino, CA (US)

(72) Inventor: Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 186 days.

(21) Appl. No.: 15/442,016

(22) Filed: Feb. 24, 2017

(65) Prior Publication Data
US 2017/0250826 A1 Aug. 31, 2017

Related U.S. Application Data
(60) Provisional application No. 62/300,698, filed on Feb. 26, 2016.

(51) Int. Cl.
*H04L 9/32* (2006.01)
*H04L 29/06* (2006.01)
*H04L 9/08* (2006.01)
(52) U.S. Cl.
CPC .......... *H04L 9/3268* (2013.01); *H04L 9/0891* (2013.01); *H04L 63/0442* (2013.01); *H04L 63/061* (2013.01); *H04L 63/0823* (2013.01)
(58) Field of Classification Search
CPC .................................................. H04L 9/3268
USPC ....................................................... 713/158
See application file for complete search history.

(56) References Cited

U.S. PATENT DOCUMENTS

| 10,389,518 | B2 | 8/2019 | Chen et al. |
| 10,417,217 | B2 | 9/2019 | Pierce et al. |
| 10,437,630 | B2 | 10/2019 | Curtis |
| 2006/0248345 | A1* | 11/2006 | Ishidera ................ G06F 21/34 713/183 |
| 2006/0288211 | A1* | 12/2006 | Vargas .................... H04L 9/30 713/170 |
| 2011/0010553 | A1* | 1/2011 | Cahn ................. H04L 63/0823 713/175 |
| 2013/0227646 | A1 | 8/2013 | Haggerty et al. |
| 2013/0339742 | A1* | 12/2013 | Ignatchenko ......... H04L 9/3247 713/176 |
| 2015/0222635 | A1 | 8/2015 | Yang et al. |
| 2016/0342977 | A1 | 11/2016 | Lam |

(Continued)

OTHER PUBLICATIONS

Cooper, et al.; Internet X.509 Public Key Infrastructure Certificate and Certificate Revocation List (CRL) Profile; Network Working Group, Request for Comments: 5280, May 2008, 151 pages.

(Continued)

*Primary Examiner* — Jacob Lipman
(74) *Attorney, Agent, or Firm* — Dickinson Wright RLLP

(57) ABSTRACT

A secure element (SE) with a notion of time useful for checking secure items is disclosed herein. Use of Public Key Infrastructure (PKI) with secure elements is improved by verifying secure items used by an SE. Methods of obtaining time information by the SE include push, pull, opportunistic, and local interface methods. The SE uses the time information to evaluate arriving and stored public key certificates and to discard those which fail the evaluation. The SE, in some embodiments, uses the time information in cooperation with certificate revocation lists (CRLs) and/or online certificate status protocol (OCSP) stapling procedures.

20 Claims, 11 Drawing Sheets

(56) References Cited

U.S. PATENT DOCUMENTS

| | | |
|---|---|---|
| 2017/0103468 A1 | 4/2017 | Orsini et al. |
| 2017/0163733 A1 | 6/2017 | Grefen et al. |
| 2017/0206382 A1 | 7/2017 | Rodriguez De Castro et al. |
| 2017/0213209 A1 | 7/2017 | Dillenberger |
| 2017/0228371 A1 | 8/2017 | Seger, II |
| 2017/0235970 A1 | 8/2017 | Conner |
| 2017/0262778 A1 | 9/2017 | Ganesan et al. |
| 2018/0039667 A1 | 2/2018 | Pierce et al. |
| 2018/0041487 A1 | 2/2018 | Wang |
| 2018/0053182 A1 | 2/2018 | Mokhasi |
| 2018/0150835 A1 | 5/2018 | Hunt et al. |
| 2018/0322561 A1 | 11/2018 | Arora |

OTHER PUBLICATIONS

Eastlake; Transport Layer Security (TLS) Extensions: Extension Definitions, Internet Engineering Task Force (IETF), Request for Comments: 6066, Jan. 2011, 25 pages.

GSM Association; Official Document SGP.01—Embedded SIM Remote Provisioning Architecture, Version 1.1, Jan. 30, 2014, 85 pages.

GSM Association; Official Document SGP.22—RSP Technical Specification, Version 1.0, Jan. 13, 2016, 114 pages.

Blockchain and Smart Card Technology; A Secure Technology Alliance Payments Council White Paper; Version 1.0; Mar. 2017 (Year: 2017).

Antonopoulos, A.M., 2014. Mastering Bitcoin: unlocking digital cryptocurrencies. "O'Reilly Media, Inc.". (Year: 2014).

* cited by examiner

OBTAINING AND USING TIME INFORMATION ON A SECURE ELEMENT (SE)

CROSS-REFERENCE TO RELATED APPLICATION

This application claims benefit of U.S. Provisional Patent Application No. 62/300,698, "OBTAINING AND USING TIME INFORMATION ON A SECURE ELEMENT (SE)," filed on Feb. 26, 2016, which is hereby incorporated by reference herein.

FIELD

The described embodiments relate to obtaining and using time information on a secure element (SE) for security purposes with respect to public-key certificates in a public key infrastructure (PKI) environment.

BACKGROUND

Communications of an SE, for example an embedded universal integrated circuit card (eUICC), may be authenticated using PKI techniques. Certificates used for authentication and confidentiality purposes can be generated by a trusted certificate issuer (CI). A public-key certificate may also be referred to herein simply as a certificate.

A user may store a copy of a certificate, where the certificate holds the name of a given party (user identity). The public key recorded in the certificate can be used to check the signature on a message signed using a PKI private key of the given party. A user or message recipient may use an on-line protocol such as on-line certificate status protocol (OCSP) to determine if a certificate is valid.

A digital signature is authentication data that binds the identity of the signer to a data part of a signed message. A certification authority (CA) is a trusted third party whose signature on a certificate vouches for the authenticity of the public key of the associated user identity. If the private key of the identified user becomes compromised, all holders of the certificate need to be notified. Notifying can be done, for example, with a certificate revocation list (CRL). Recipients of the CRL no longer trust messages signed with the corresponding public key of the identified user.

Also, a public-key certificate may expire at a certain point in time. So, separate from the compromise issue, there is a need to improve recognition of expired certificates. Generally, time-variant parameters can be used in identification protocols to counteract replay attacks and to provide timeliness guarantees.

SUMMARY

Representative embodiments set forth herein disclose various systems and techniques for using time information in an SE to improve security in PKI environments.

An SE, in some embodiments, obtains time information from an authenticated message. An SE, in some embodiments, obtains time information from a trusted interface with a device local component. The SE can store the time information for subsequent use. The time information may be in the form of actual calendar time expressed in terms of year, month, day, hour, minute and second. In some embodiments, the time information is a counter value, where a counter state determining a counter value is recognized by the SE and at least one other entity.

Time information may be pushed to the SE by a CI on a periodic basis, for example. Time information may also be requested by the SE and then supplied by the CI in response to the request. In some embodiments, the SE opportunistically obtains time information by retaining time values parsed from messages primarily devoted to other purposes.

Time information may correspond to a CA or to a set of CAs. In some embodiments, the time information has a global aspect and can be applied to test security materials from any CA or other entity corresponding with the SE using PKI security.

After the SE obtains time information, the obtained time information can be used to replace pre-existing time information. For example, the obtained time information can be an update of the existing time information.

The obtained time information can be used to check for expiration of security materials, e.g., CRLs, public keys and certificates.

Time information can be used by the SE in conjunction with other certificate revocation schemes, e.g., the time information can be used when a CRL is received, when an OCSP stapling message is received, or when a server is compromised and a CI is establishing a new version number of certificates, also referred to as an epoch value. For example, the SE can trust a given server if the difference between a time in an OCSP stapling message and the time information falls within a security window, or if the given server can produce a certificate with the new epoch value.

The SE can store time information in, for example, a memory of the SE operating system or in an eUICC controlling authority security domain (ECASD).

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
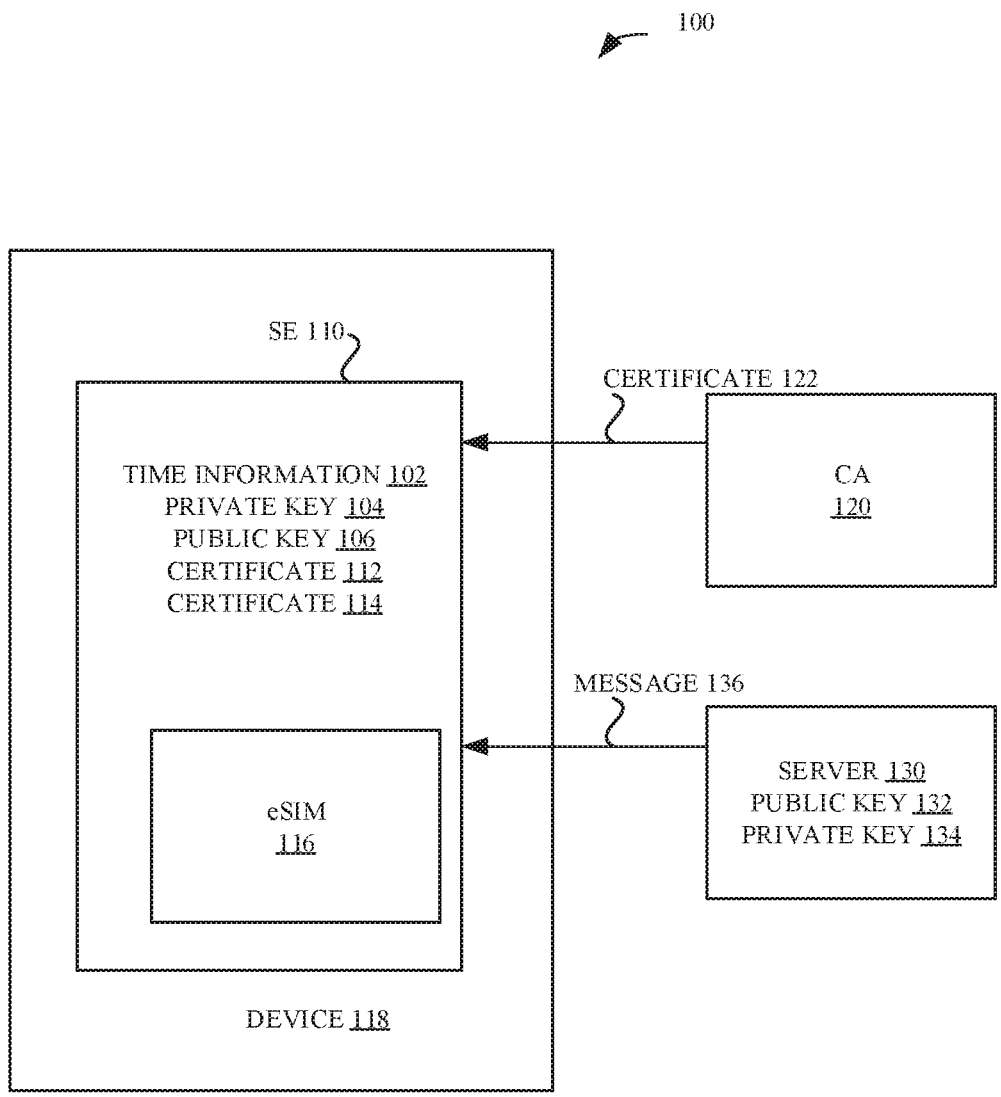
FIG. 1 illustrates an exemplary SE with time information in communication with a CA and a server, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

A wireless communication device may include memory resources and computational capacity to perform maintenance of its stored certificates using CRLs. A wireless communication device hosting an SE may also have a notion of actual time. An SE may be limited in memory, computational clock rate, and time information.

Interest is increasing in the use of securing SE communications using PKI. Some problems or challenges with using PKI by an SE are as follows: i) checking expiration of certificates, ii) checking validity of a CRL list, iii) checking the validity of OCSP stapling messages, and iv) removing expired or compromised certificates from certificate-related storage.

PKI

Communications of an SE can be authenticated using PKI techniques. PKI relies on the infeasibility of a third party determining a private key of a public key—private key pair from the public key. The public key is communicated in a data structure called a certificate. A message encrypted with the private key is trusted to be from the purported signing party (i.e., authenticated) if decryption of the message with the corresponding public key is successful and the certificate holding the public key has not been revoked.

Certificates

A certificate is a means by which a public key can be stored and distributed over unsecured media without danger of undetectable manipulation. In practice, X.509 certificates are commonly used. X.509 is an ANSI standard which defines a certificate data structure. A public key certificate is a data structure consisting of a data part and a signature part. The data part includes a public key and a string identifying the party associated with that public key. The data part can also include a validity time period of the public key. For example, the data part can hold a published time and an expiration time. In addition, the data part can hold a serial number of the certificate or public key. The signature part consists of the digital signature of a certification authority; the signature part is the result of a function computed over (based on) the data part.

A digital signature is authentication data which binds the identity of the signer to the data part. Signing transforms the data part and some secret information held by the signer into the signature. A CA is a trusted third party whose signature on the certificate vouches for the authenticity of the public key. Because the CA is trusted, the certificate allows transfer of the CA's trust in the identified party such that the certificate recipient can securely place their trust in the identified party. If the private key of the identified party becomes compromised, all holders of the certificate need to be notified so that they will no longer trust messages signed with the corresponding public key of the identified party. This notification can be done, for example, with a CRL or detected by a negative result from OCSP.

OCSP is an Internet Engineering Task Force (IETF) protocol specified by RFC 6960. OCSP stapling (see IETF RFC 6066) is an extension of OCSP. OCSP stapling allows the presenter of a certificate to provide a timestamped OCSP response signed by a CA to the party seeking the certificate. An SE can use OCSP stapling as a trust verification technique in order to reduce or eliminate storage of trusted certificates (public keys) and/or CRLs. The party wishing to communicate (the certificate presenter) with the SE may supply an OCSP stapling message to the SE on an as-needed basis.

Compromise or Expiry of a Certificate

If a third party obtains the private key of a public key—private key pair, the security of the system is broken. This is because the third party can act as an imposter and sign messages with the private key as if the third party were the identified party associated with the public key. Harm can be limited by notifying communicating parties that the associated certificate is now revoked. Thus, there is a need to improve the security of PKI-secured communications performed by an SE since a server trusted by the SE may become compromised.

Time

Time-variant parameters which serve to distinguish one instance of something from another are sometimes called nonces, unique numbers, or non-repeating values. A nonce is a value used no more than once for the same purpose. Random numbers include pseudorandom numbers which are unpredictable to an adversary. A sequence number can serve as a unique number identifying a message. A sequence number can be a version number for a file. Sequence numbers are specific to a set of entities who follow a pre-defined policy for numbering. Timestamps can be used to implement time-limited access privileges.

A user of a timestamp obtains a timestamp from a local clock and cryptographically binds it to a message. Upon receiving the timestamped message, a second party obtains the time from its own clock and subtracts the timestamp received. The message is valid if the timestamp difference is in an acceptable security window. The security of timestamp-based verification relies on use of a common time reference; this requires that the sender's clock and the recipient's clock be at least loosely synchronized.

SE, eUICC

One example of an SE is an embedded universal integrated circuit card (eUICC). A eUICC can host profiles. A profile is a combination of operator data and applications provisioned on an eUICC in a device for the purposes of providing services by an operator. A profile can contain one or more secure data used to prove identity. An eSIM is an example of a profile. An eSIM is an electronic subscriber identity module.

An eUICC includes an operating system, and the operating system can include ability to provide authentication algorithms to network access applications associated with a given operator. The operating system also can include the ability to translate profile package data into an installed profile using a specific internal format of the eUICC. An ECASD provides secure storage of credentials required to support the security domains on eUICC. A controlling authority security domain (CASD) may also be referred to as a "key store" herein.

SE Time Information

In some embodiments provided herein, an SE stores time information in order to improve checking of secure materials. The time information is stored in a time information variable and the value of the time information variable at a given moment is a time information value. The actual time can be stored, for example in a numerical string "yyyymmddhhmmss" providing four decimal places for the year, "yyyy", two for the month, two for the day of the month, two for the hour of the month, two for the minute of the hour and two for the second of the minute. In some embodiments, an SE may record a time information value as the value of an increasing counter. One example of an increasing counter controlled centrally may be referred to as an epoch.

A CI or other CA may refresh the time information in the SE periodically. The refresh period, in some embodiments, is about one day. The refresh period is a security requirement. The refresh period, in some embodiments, is shorter than an average time between server compromise or average time between certificates expiring. The refresh period is sufficiently long to avoid unnecessary communication burden for the SE, and, for example, the CI. For example, on a daily basis, a CA or the CI may push a new time information value to the SE, in some embodiments. The SE, in some embodiments, pulls a new time information value from a CA or the CI. That is, the SE sends a message requesting a new time information value.

The time information value received by an SE is signed by a CA. By implementation, time information signed by other trusted off-card entities (off-SE entities) may also be acceptable based on the SE configuration. Time information that is not under the signature of a trusted entity is not recognized or used by an SE.

Distinct time information values, in some embodiments, are maintained in the SE for two or more CAs. For example, a first CA may send a first counter value to the SE and a second CA may send a second counter value to the SE. In some embodiments, a CI provides widespread time information and the SE maintains a single time information value. For example, a first CI may send an actual time value on a first day. In some embodiments, a second CI, different than the first CI, may send an actual time value on the first day or another day.

In some embodiments, the time information value is updated on an opportunistic basis based on unrelated transactions between the SE and any trusted party. For example, any signed and verified time information from a CRL, OCSP, or OCSP stapling message can be used by the SE to update its time information. Since many transactions are unscheduled, these time information updates occur randomly or stochastically. The stochastic time information value update incurs no additional communication overhead because it occurs in parallel or in the background to an unrelated transaction.

Time information, in some embodiments, is obtained over a trusted interface between the SE and a local component of the device.

Epoch

A CA may increase an epoch value; this will be reflected in subsequently issued certificates. As discussed above, an epoch value may be a counter type of time information. In some embodiments, the epoch is increased when a new certificate is issued. The SE can verify that the epoch in a received certificate is higher than that of a current certificate, before storing the new certificate. Revoking certificates in an SE can be challenging due to various SE resource constraints; i.e., processing a large revocation list may be infeasible for an SE. To avoid maintaining revocation lists, some certificates can be associated with an epoch. If a CA is compromised, the CI (which may also be referred to as a root CA) creates a unique unused epoch value and reissues certificates for all legitimate entities with the new epoch value in each new certificate. At the SE, the SE saves the expected epoch of various servers in non-volatile memory. When a received certificate contains a higher epoch, the SE may update the corresponding epoch and reject any future certificates with a lower epoch; i.e., the SE will reject rogue servers possessing certificates that have not been signed since the CA was compromised.

SE Methods

Maintenance of a time information variable or parameter in an SE allows the SE to perform a certificate expiration and/or publication date and/or time check. For example, if an expiration time value in a certificate is earlier than the time information value stored in the time information variable, in some embodiments, the SE may i) discard the certificate, ii) request a new certificate, iii) use the OCSP protocol, iv) use the OCSP stapling protocol, and/or v) rely on an epoch value as part of authenticating communications from the certificate holder.

The SE, in some embodiments, may compare an incoming certificate or related message (e.g. OCSP stapling) time with the time information stored in the SE to ensure validity. The time checking can be done in several different ways. The purpose of the time checking is to check that the examined item (certificate, CRL, OCSP stapled message, or other secure message) is up-to-date, current, fresh, and/or not expired. The essential aspect of the time check is to measure a difference in time between the time information in the SE and a time value of some kind associated with the examined item. A thresholding measurement or acceptable difference may be indicated by use of a security window. A certificate, CRL, OCSP stapled message, or other secure message may be referred to herein as secure material.

For time information of an actual (calendar) type, the difference may be computed as follows. Let TM be the time information in the SE. Let TC be general time information parsed or read from the examined item (secure material). Let TDexp be the difference taken as TDexp=TM−TCexp, where TC may be denoted TCexp, and TCexp is an expiration time. The TDexp value, a difference, will be negative if the expiration time is in the future, that is, occurs later than the SE time information, TM. Let TDpub be a difference taken as TDpub=TM−TCpub. Where TCpub is a publication time. The value of TDpub will in general be positive. In some embodiments, if TC represents an expiration time, TCexp, and TD is zero or positive, the SE discards the examined item and does not process any messages using it because the expiration time is not in the future. For example, if the examined item is a certificate for a particular user identity and TD is zero or positive, the SE discards the certificate, and optionally, requests a new certificate for the particular user identity.

In some embodiments, TCpub may be the issuance time of the certificate or the CRL/OCSP published time in a response message. A positive TDpub value may be considered more reliable and a negative TDpub value may be considered unreliable in typical cases. However due to possible TM update delays, TDpub may be negative; a negative value of TDpub of small magnitude can be accepted within a security window based on configuration. It is then configurable whether TM should be updated by using TCpub as new time information based on the trust level of the source of the obtained TCpub value.

The extent of the age of the examined item versus TM can be determined with the security window. Let the value of the security window be represented by a positive value TW. Determine TDexp as above. If TDexp<TW, then the time associated with the examined item, in some embodiments, is deemed to be within the security window. If TDexp is greater than or equal to TW, then the examined item is considered a security risk, and the examined item will be discarded because the expiry time was too long ago. In some embodiments, TDpub is determined as above. The expected outcome is that TDpub>0. However, there may be a lag in updating TM, such that a small negative value of TDpub would not indicate a fault. Thus, if 0<−TDpub<TW is true for TDpub<0, then the examined item is not considered a security risk solely based on the published time TCpub. The certificate may be identified as a security risk for other reasons.

In general a calculated time difference is referred to herein as TD. Whether the time difference corresponds to a publication time, expiration time, or another time is determined by the nature of the time obtained from the security material. In any case, TM can be used for a security check to provide a TD to compare with an appropriate security window TW as described above.

For time information of a counter type, the difference may be computed as follows. Let TMcounter be the time information in the SE. Let TCcounter_exp be the time information parsed or read from the examined item (secure material) corresponding to an expiration time. Let TDcounter_exp be the difference taken as TDcounter_exp=TMcounter−TCcounter_exp. If TCcounter_exp is a current version number or an epoch value, then this difference will be zero if the examined item is current or up-to-date. In some embodiments, if TDcounter_exp is positive, the SE discards the examined item and does not process any messages using it. For example, if the examined item is a certificate for a particular user identity and TDcounter_exp is positive, the SE discards the certificate, and optionally, requests a new certificate for the particular user identity.

Corresponding calculations for a certificate publication time using counter type time information, in some embodiments, follow a similar approach. That is, TDcounterpub=TMcounter−TCcounterpub, and the same reasoning as applied for TCpub, TDpub, and TW above. For example, it is expected that TDcounterpub will be positive. Small negative values of 0<−TDcounterpub<TWcounter are not considered a security risk solely based on TCcounter_pub.

The SE may use the stored time information, in some embodiments, together with revocation schemes such as CRL and OCSP. For example, upon receiving a CRL, the SE may i) immediately place on an untrusted list identities of servers whose certificates are identified in the CRL, and ii) continue to rely on the certificates of servers not identified in the CRL. In some embodiments, the SE receives an update to an epoch value from a CI, for example. The SE then, in some embodiments, does not communicate with the servers identified in the CRL until new certificates for those servers arrive at the SE with the updated epoch value. This allows smooth transition between new and old epoch update and yet allow manageable size of CRL stored on the client side.

In some embodiments, an SE obtains an OCSP stapling message including a time at which the CA timestamped and signed the OCSP response. The SE may then compare the time information value stored in the SE against the signed timestamp of the OCSP stapling message (OCSP stapling timestamp). If the difference of the SE time information value and the OCSP stapling timestamp is within an acceptable window, the SE, in some embodiments, will consider the associated certificate to be trustworthy (i.e. not stale, not compromised, not revoked).

Also, the SE may check the epoch in addition to checking the OCSP stapling timestamp. Depending on the security required, the SE may trust the certificate associated with the sender if either the difference of the SE time information value and the OCSP stapling timestamp is within a security window or if the epoch value associated with the received OCSP stapling message matches a current epoch value maintained by the SE. In some embodiments, the SE may require that all indications concerning the OCSP stapling message are not stale. That is, the SE may only process the message if the difference of the SE time information value and the OCSP stapling timestamp is within the security window and the epoch value associated with the received message matches a current epoch value maintained by the SE.

Periodically, or after updating the timestamp information, the SE may perform a cleanup operation on the certificates and/or CRL list store in the SE. For example, after updating the time information on the SE, the SE operating system (OS) may identify information that is stale based on being too old compared to the time information value. For example, any certificate with an expiration time before an actual time stored as time information can be discarded and/or the associated server moved to an untrusted list. Any certificates which are vouched-for based on OCSP stapling can be discarded if a difference between the SE time information value and the timestamp included in the OCSP stapling message falls outside of a security window. The window may, for example, correspond to one day, one week, or one month.

In this way, trusted and stored public keys and certificates that have expired can be deleted from the memory or key store of the SE. Also, when a CRL list or entries in the CRL are no longer valid, the CRL list can be corrected by recognizing servers which have obtained new certificates from, for example, a CI. In addition, an untrusted list can be updated with servers whose certificates have expired or who fail the OCSP or OCSP stapling protocol. Servers which are associated with certificates having time information or OCSP information or OCSP stapling information which falls inside of a security window when compared with the SE time information may be listed on a trusted list of servers.

Embodiments will now be described with regard to the figures.

Obtaining and Using Time Information, Overview

FIG. 1 illustrates an exemplary system 100 for an SE 110 obtaining and using time information 102. The time information 102 corresponds to a time information value stored in a time information variable in the SE 110. The time information variable can be, for example, an addressed location in a memory of SE 110. SE 110 in some embodiments possesses a public key —private key pair 106/104. Exemplary stored certificates 112 and 114 are shown stored in the SE 110. The SE 110 may host an eSIM 116. The SE 110 may reside in a device 118. The device 118, in some embodiments, is a wireless communication device. In the exemplary arrangement 100, a CA 120 sends a certificate 122 to the SE 110. The certificate 122 is associated with an identity of a server 130. The server 130 associated with a public key—private key pair 132/134 sends a message 136 signed with the public key 132 to the SE 110.

The SE 110, in some embodiments, verifies the signature of the CA 120 on the certificate 122. If the verification is successful, that is, authentication of the certificate using the public key of CA 120 produces a correct result, then the SE 110 parses from the message received with the certificate 122 a time information value. In some embodiments, the SE 110 then checks the stored certificates 112 and 114 to see if they have expired.

The SE 110 can then determine, for example, if the time information value is for the CA 120 only (i.e., corresponds uniquely to CA 120) or is a widespread or quasi-global time value which is at least loosely synchronized with many CAs, CIs, and servers. Time information 102 of FIG. 1 represents, in some embodiments, several storage locations or time variables. Based on the determination, the SE 110 saves the time value as time information 102.

In some embodiments, the SE 110 verifies the signature of the CA 120 on the certificate 122 and compares an expiration time of the certificate 122 with the time information 102. The comparison may be done, for example, by subtracting the expiration time of the certificate 122 from the value of time information 102. For this type of comparison, the time information 102 may represent, for example, actual calendar time. If the expiration of the certificate is in the future with respect to the time information, that is the result of the subtraction is negative, then the certificate 122 is adjudged to be unexpired and valid. If the publication time of the certificate is in the future with respect to the time information, that is the result is positive but less than a fixed amount of time referred to herein as a security window, then the certificate 122 could also be adjudged to be valid. If the result is positive and not within the security window then the certificate 122 is adjudged to be stale or expired and not to be trusted. When the certificate 122 is determined to be untrusted, SE 110 will not process the message 136 because the SE 110 cannot be confident that the message 136 is indeed from the server 130. Possibly a mischievous or adversarial or computer-hacker entity has sent certificate 122 and message 136 to SE 110; careful security requires that message 136 in this case not be processed.

The SE 110 can request a new, updated certificate for the server 130. The new certificate will be based on a new public key—private key pair (not on the public key—private key pair 132/134).

Obtaining and Using Time Information, Exemplary Logic

Figure 2:
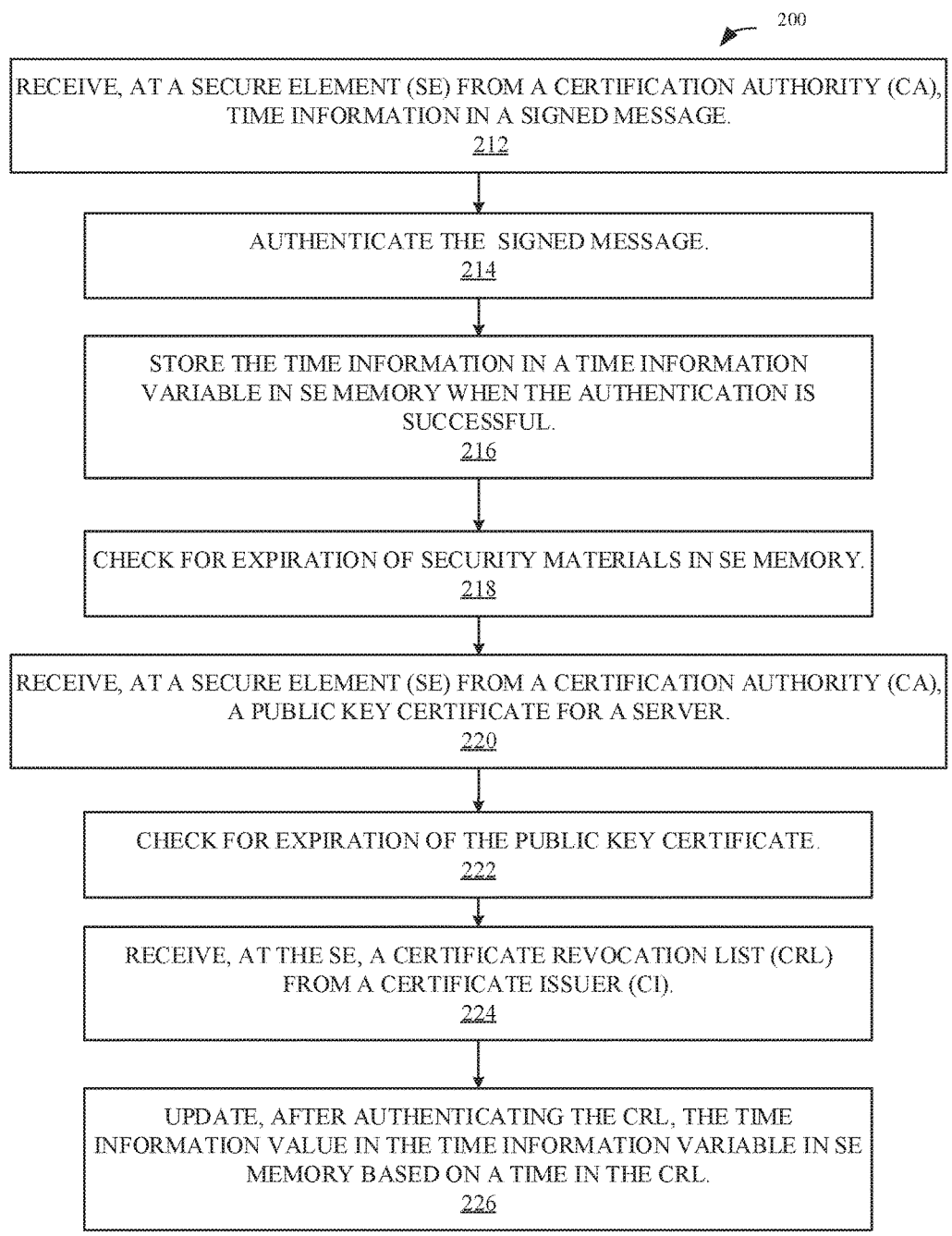
FIG. 2 provides exemplary logic illustrating obtaining and using time information, according to some embodiments.

FIG. 2 illustrates exemplary logic 200 for obtaining and using time information. At 212 an SE receives time information in a signed message from a CA and authenticates the message at 214. The time information is stored in the SE at 216 when the authentication is successful. The SE then performs a cleanup operation at 218. This cleanup operation may be done whenever a new time value is obtained, or when a duration of time is estimated to have passed based on the new time information and a time of a previous cleanup operation. The duration of time may be estimated by i) storing a time value each time a cleanup is done and ii) subtracting the previous time value from the new time value. In the exemplary logic 200, some time may pass between 218 and 220. 220 indicates a message reception from a CA, possibly unscheduled, of a certificate for a server. At 222, the SE checks an expiration time of the received certificate against the time value stored in the SE. If the certificate has expired (not shown), the SE will discard it. Some time may pass between 222 and 224. At 224, the SE receives a CRL, possibly unscheduled, from a CI. At 226, the SE does an authentication check on the CRL. If the signature of the received CRL proves to be that of the CI, then the SE proceeds to parse out time information from the CRL or CRL message from the CI and update the stored time information.

Push, Pull, Opportunistic, and Local Time Learning

Figure 3:
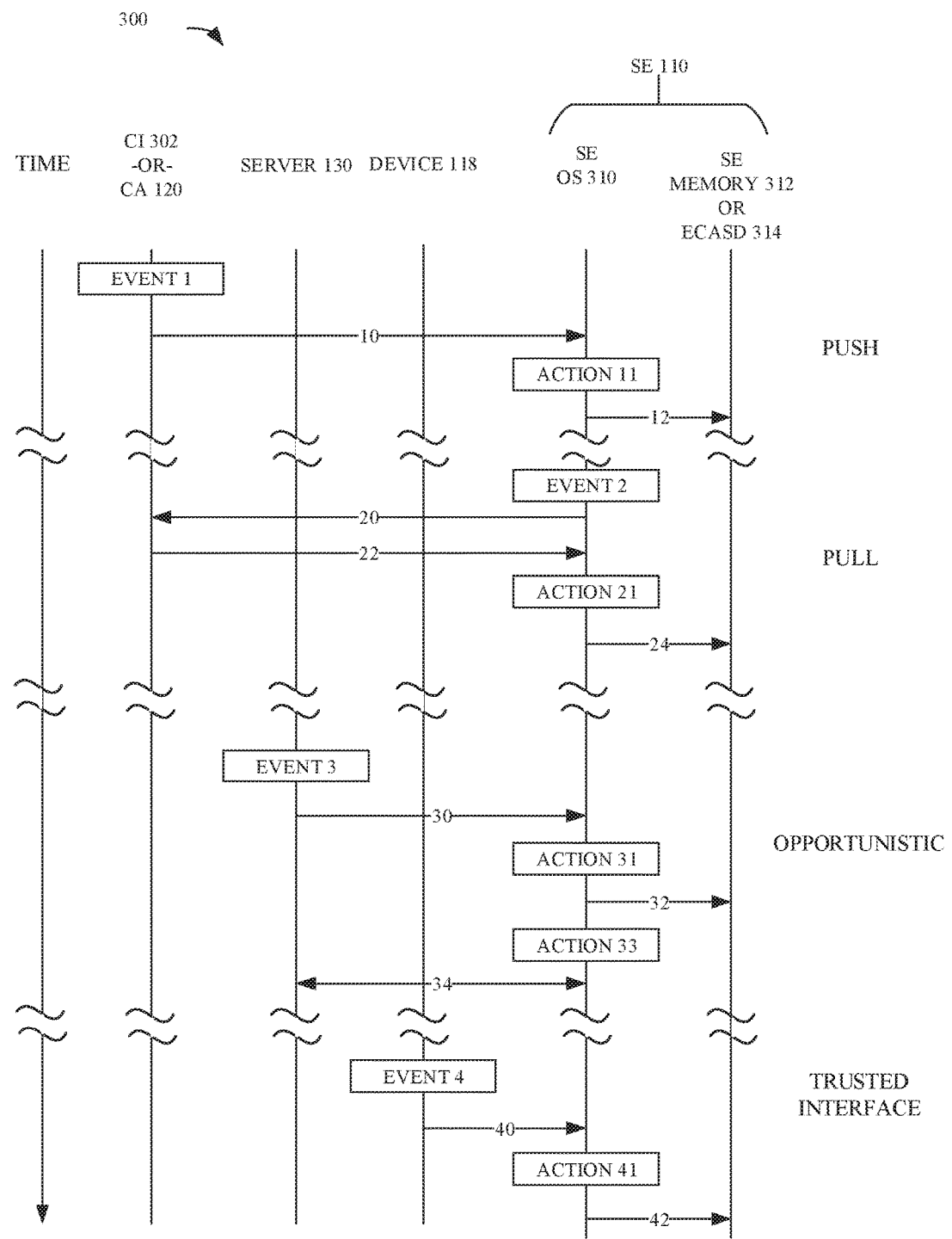
FIG. 3 illustrates exemplary push, pull, opportunistic, and local device sourcing approaches to obtaining time information, according to some embodiments.

FIG. 3 illustrates three exemplary approaches for the SE 110 to learn or obtain time information. FIG. 3 is a message flow diagram with time advancing from top to bottom. Parties communicating with each other or communication endpoints are shown across the top of the figure. The end points of the messages are represented as solid vertical lines below the party labels.

The first method of obtaining time is a push event (this portion of the drawing is annotated "PUSH"). This is indicated as Event 1 and it is initiated, for example, by a CI 302 or the CA 120. Time information is pushed to SE 110 in a message indicated by the left-to-right arrow denoted with the number 10 ("message 10"). When an SE OS 310 receives the pushed time information, it performs actions denoted as Action 11. The actions include authenticating message 10 and determining if the received time is later than the stored time. If the message 10 is authentic and the received time is later than the stored time, then the variable corresponding to time information 102 in an SE memory 312 or in an ECASD 314 is updated with the received time by message 12. The next read of the SE memory 312 or ECASD for time information 102 will produce a value corresponding to the time information received in the message 12.

The time axis is marked with a broken wavy line before the next event, Event 2. Event 2 corresponds to the SE initiating a request for time information with a message 20; this is a pull event. The CI 302 or CA 120, for example, responds to message 20 with message 22. Action 21, similar to Action 11, represents authenticating and checking the received time. Internal SE message 24 represents storing the new time information value in time information 102.

An opportunistic or stochastic method of learning time is triggered by unscheduled Event 3. Server 130, for example, initiates an unscheduled PKI challenge response sequence with SE 110 for some purpose unrelated to time information 102. Possibly the server 130 is unaware of the existence of a security time feature in the SE 110. Possibly the PKI challenge response is due to a user of the device 118. In any case, a message 30 arrives at the SE OS 310 bearing, incidentally, time information. The SE OS 310 parses out the time information and performs action 31, which is similar to actions 21 and 11 (authenticate, possibly check if the time is newer than the old time). If appropriate, SE OS 310 updates time information 102 using internal message 32. After Action 31 (or before, not shown) Action 33 and messages 34 may occur corresponding to the purpose of Event 3 and message 30 from the point of view of the server 130.

The SE, in some embodiments, receives the time information via a trusted interface with a local component of the device 118. A component of device 118 may initiate an Event 4 as shown in FIG. 3 (annotated "TRUSTED INTERFACE"). Event 4 may also be responsive to a pull request (not shown) similar to message 20, but directed to a local component of the device 118. A message 40 arrives at the SE OS 310 carrying time information. SE OS 310 processes the message at Action 41. Message 42 updates time information 102 using internal message 42.

Some SE Variables

Figure 4A:
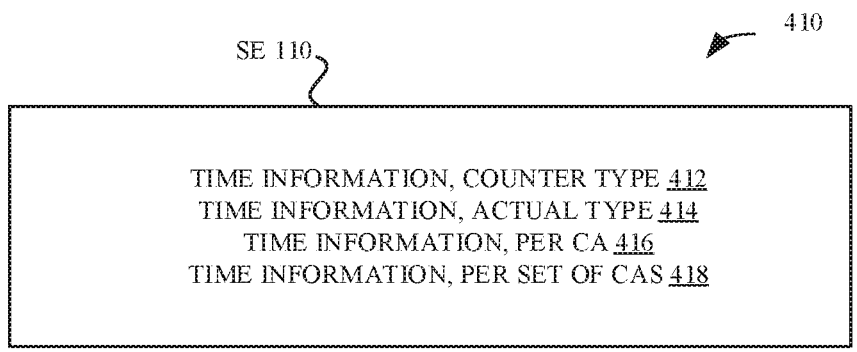
FIGS. 4A-4C illustrate exemplary time information embodiments, trusted and untrusted lists, and parameters and variables used in example certificate revocation schemes, according to some embodiments.
Figure 4B:
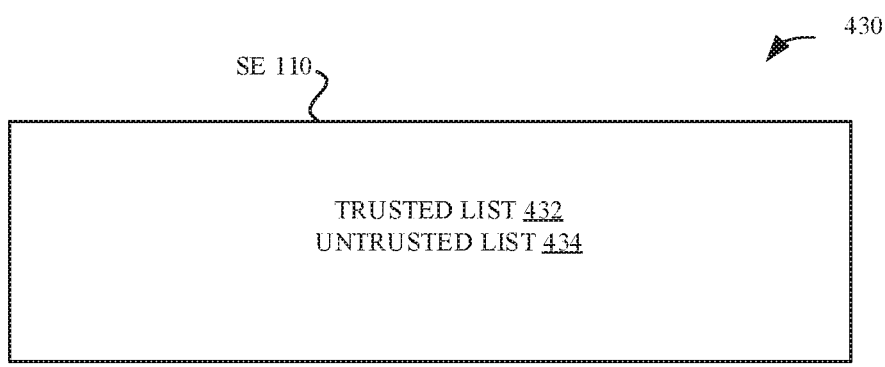
Figure 4C:
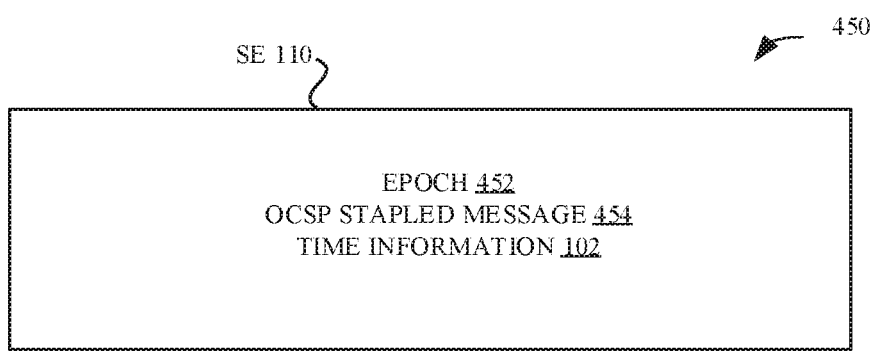

FIGS. 4A-4C illustrate various time and security-related variables, parameters and values in the SE 110.

FIG. 4A provides various time information formats and types, in some embodiments. The time information of messages 10, 22, and 30 of FIG. 3 may be of a counter type represented as time information, counter type 412 in FIG. 4A.

If a difference between a received time information value indicated as a counter type in a certificate being evaluated by the SE 110 and time information, counter type 412 is greater than a security window for counter types, the SE 110 can regard the certificate being evaluated as expired. The methods of time checking using counter type (and actual type) time information as discussed in the section "SE Methods" above may be applied in any of the embodiments described herein.

Alternatively, any one of the time information of message 10, or of the time information of message 22, of the time information of message 30 may be an actual calendar time type as indicated by time information, actual type 414 in FIG. 4A. If a difference between a received time information value indicated as an actual type in a certificate being evaluated by the SE 110 and time information, actual type 412 is greater than a security window for actual types, the SE 110 can regard the certificate being evaluated as expired.

If the time information is unique to a CA, a portion of time information 102 may be stored in a variable represented herein by time information, per CA 416 in FIG. 4A. Finally, if time information is for a set of CAs, or, for example, global or quasi-global, a portion of time information 102 may be stored in a variable represented herein by time information, per set of CAs 418.

FIG. 4B represents two summary forms of information that, in some embodiments, the SE 110 may maintain. Trusted list 432 represents a list of entities, servers, CAs, or CIs, for example, which the SE 110 trusts. For example, presence of an entity identity or user identity on trusted list 432 can indicate to the SE 110 that a certificate for that entity is stored in the SE 110 and has not been found to be expired or revoked. Untrusted list 434 can represent a list of entities, servers, CAs, or CIs, for example, which the SE 110 does not trust. For example, presence of an entity identity or user identity on untrusted list 434 can indicate to the SE 110 that no valid unexpired, or unrevoked certificate for that entity is stored in the SE 110. SE 110, in some embodiments, updates trusted list 432 and untrusted list 434 based on events. For example, a given entity identified on the untrusted list 434 may become a trusted entity if a trusted third party such as a CI provides a signed certificate for the given entity.

FIG. 4C illustrates exemplary variables for checking certificates. Epoch 452 represents a present epoch value, like a version number, which is current or up-to-date. A certificate received by the SE 110 which includes an epoch value older than epoch 452 may be considered to be expired. The variable indicated as OCSP stapled message 454 indicates a current or up-to-date voucher message from a CA indicating that a certificate of some entity is valid. The time information 102 can be used for detecting expired certificates.

Figure 5:
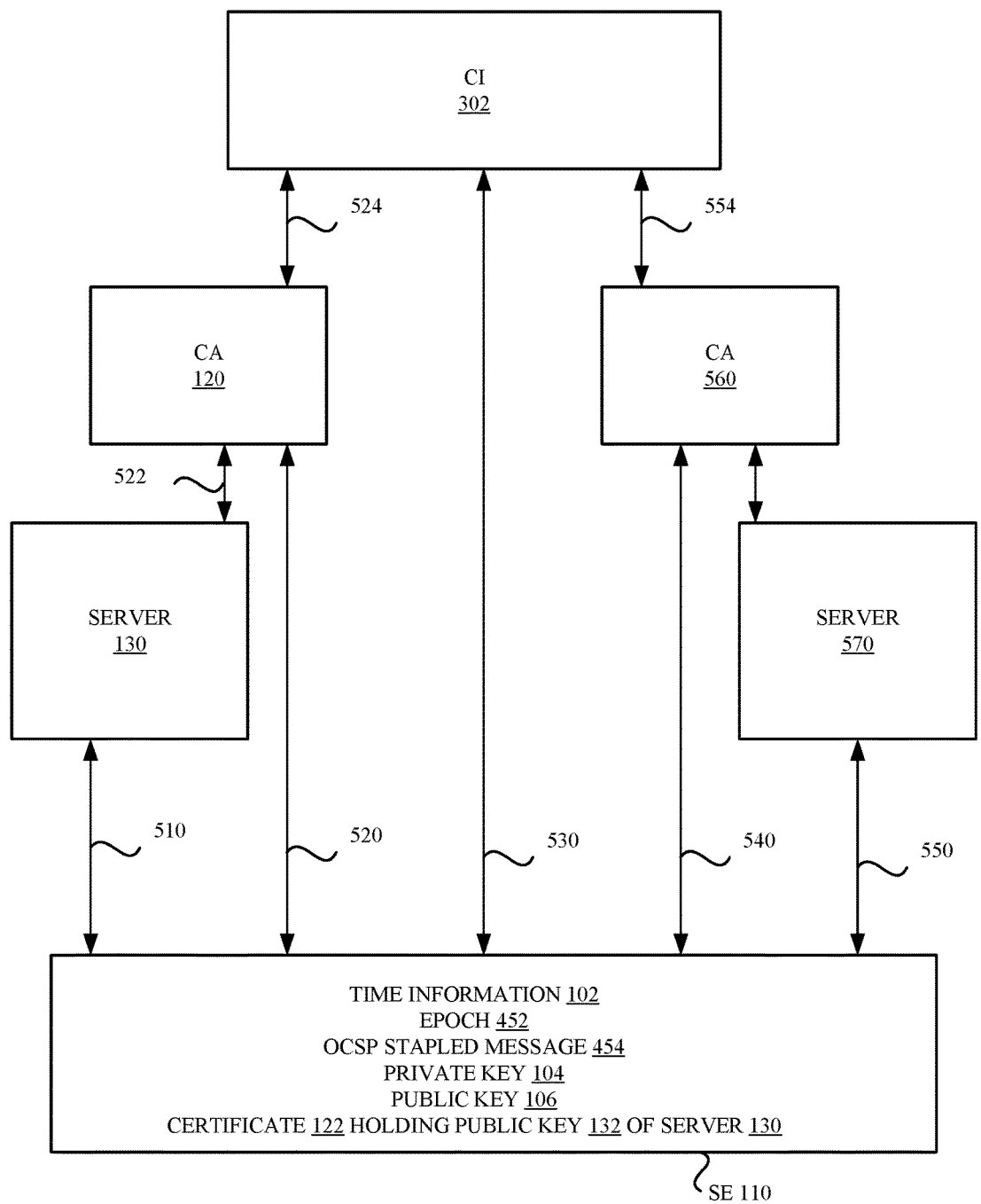
FIG. 5 illustrates an exemplary PKI environment including an SE with time information, according to some embodiments.

FIG. 5 provides an example of a PKI environment. The double-headed arrows of FIG. 5 are not limited to particular messages but represent example connectivity. The CI 302 is shown at the top of the figure and represents a trusted third party. Trust is shared with other entities by means of their trust in CI 302. For example, the CI 302 can provide via message exchange 524 a signed certificate to the CA 120. Similarly, the CI 302 can provide via message exchange 554 a signed certificate to a CA 560. The CA 120 can prove to server 130 that it is trustworthy using the certificate that the CA 120 was provided by the CI 302. The CA 120, may for example, provide a certificate to the server 130 including the public key 132, represented, for example, by messages 522. Thus there is a chain of certificates leading from the root certificate of CI 302 to the certificate of CA 120 to the certificate of server 130. The SE 110 may, for example, obtain a certificate from the CI 302 via messages 530 at the time of manufacture. Such a certificate would include the public key 106 of the SE 110.

The server 130, the CA 120, the CI 302, the CA 560 and/or the server 570, may provide time information to the SE 110 via messages 510, 520, 530, 540, and 550, respectively.

Certificate 122 of FIG. 1 may pass in a message 520 from the CA 120 to the SE 110, for example. The presence of certificate 122 in the SE 110 is indicated in FIG. 5. Message 136 from the server 130 to the SE 110 may pass in a message 510, for example. Similarly, the push, pull and opportunistic events Event 1, Event 2 and Event 3 of FIG. 3 can occur among the entities indicated in FIG. 5. The push and pull events can be scheduled; they are deterministic in the sense that messages can be sent purposefully at certain times to cause time information refresh. For example, a push event can be scheduled by a server, CA, or CI daily. The SE can schedule a pull event daily. The SE 110 thus maintains useful time information 102. The time information 102 can be, for example, counter type 412 and/or actual type 414. The time information 102 can be, for example, per CA 416 and/or per set of CAs 418. The SE 110 may also have, for example, a value in Epoch 452 and an OCSP stapled message 454 associated with, for example, the server 570.

Figure 6:
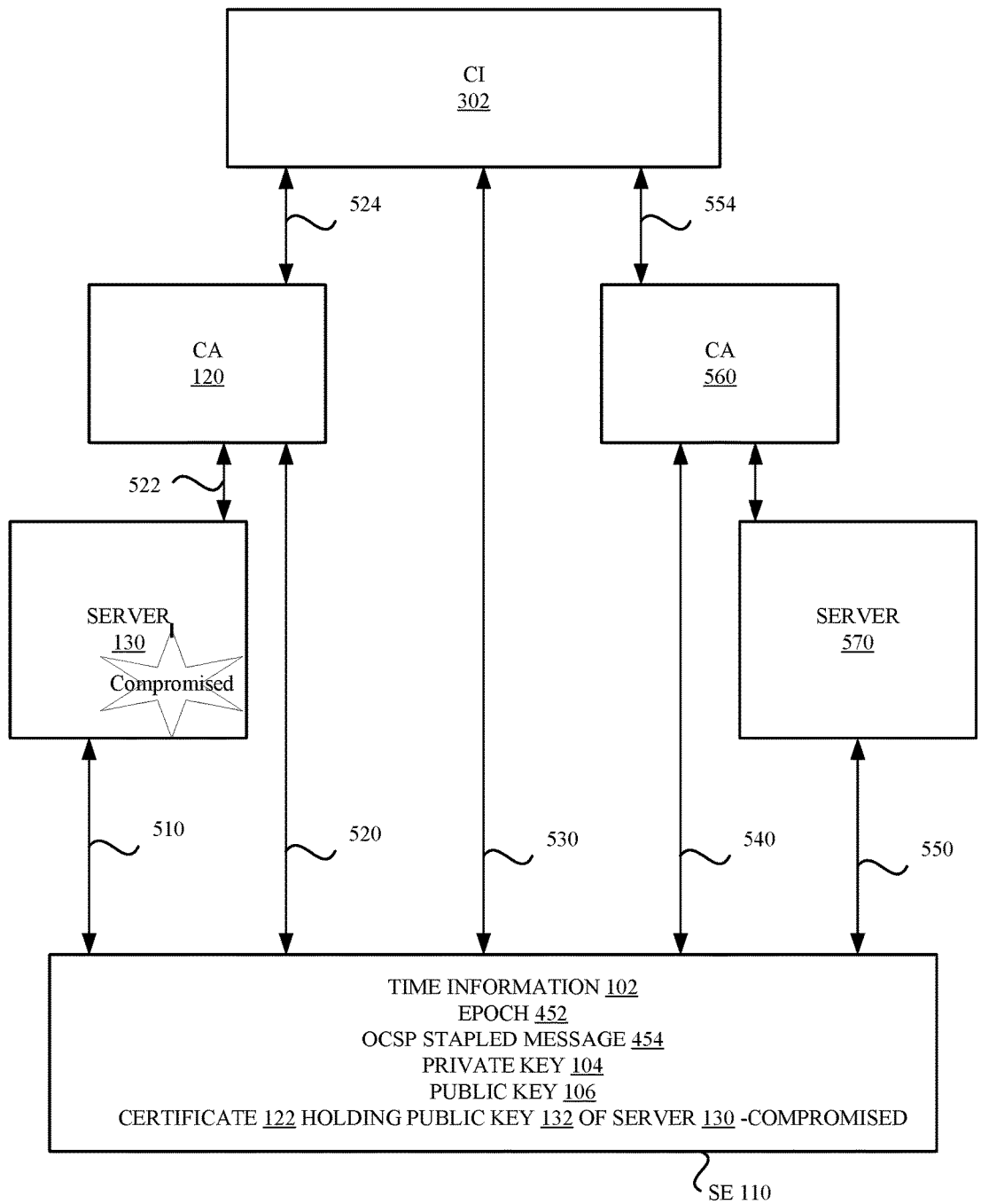
FIG. 6 illustrates an example event in the PKI environment of FIG. 5 in which the certificate of a server has become compromised or otherwise been withdrawn from use, according to some embodiments.

FIG. 6 illustrates an example situation among the entities of FIG. 5 when the PKI credentials of server 130 have been compromised as indicated by the star figure juxtaposed on server 130. In this case, a CA or CI will produce a CRL identifying the server 130 and distribute the CRL. The server 570 has not been compromised, and so is not listed in the CRL. Based on a satisfactory check on the expiration, epoch, or publication time of the CRL, SE 110 can process the CRL and hence treat the certificate 122 as untrustworthy as explained below.

In FIG. 6, certificate 122 holding public key 132 of server 130 is now unsuitable to be part of a chain of certificates all the way to the trusted party CI 302. Successfully decrypting, by the SE 110, a message signed with private key 134 using public key 132 no longer proves authentication.

After receiving the CRL, the SE 110 can evaluate the CRL using time information 102. As one example time check, after authenticating the CRL, the SE 110 can determine a difference between a time value parsed from the CRL and the value of the time information 102. If the difference indicates that the CRL time value is within a security window, the SE 110 can place confidence in the CRL and process it. Processing the CRL can include finding the certificate 122 to be untrustworthy and thus placing the identity of the server 130 on the untrusted list 432 and/or removing the identity of the server 130 from the trusted list 434.

In some embodiments, the CI 302 can initiate a migration of the PKI environment of FIG. 6 to a new epoch value after the compromise of the server 130. This will take some time. Perhaps several days such as seven days. While the new epoch value is propagating to the various entities and new certificates are issued indicating the new epoch value, the SE 110 may, for example, evaluate the legacy certificates of entities using OCSP stapling and the time information 102. For example, the SE 110 may possess a certificate for the server 570 with the old epoch value and the OCSP stapled message 454 may correspond to a certification of the server 570. If the identity of the server 570 is not on the CRL and the SE 110 either has a certificate of the server 570 with the most recent epoch value before the update, or the SE 110 determines that a difference between the time of the OCSP stapled message 454 for the server 570 and the time information 102 is within a security window, then the SE 110 can continue to use the certificate it has for the server 570; otherwise, the SE 110 can place the identity of the server 570 on the untrusted list 434.

Alternatively, the SE 110 can trust the existing certificate of the server 570 if i) the existing certificate for the server 570 has the most recent epoch value, and ii) the difference of the time in the OCSP stapled message 454 and the time information is within the security window. The SE 110 does not trust any identity listed on the CRL until new certificates are issued for those entities or user identifiers listed on the CRL. The SE 110, in some embodiments, trusts an entity not listed on the CRL which has the new epoch value in a new certificate issued after the CRL.

Logic for Obtaining and Using Time Information

Figure 7:
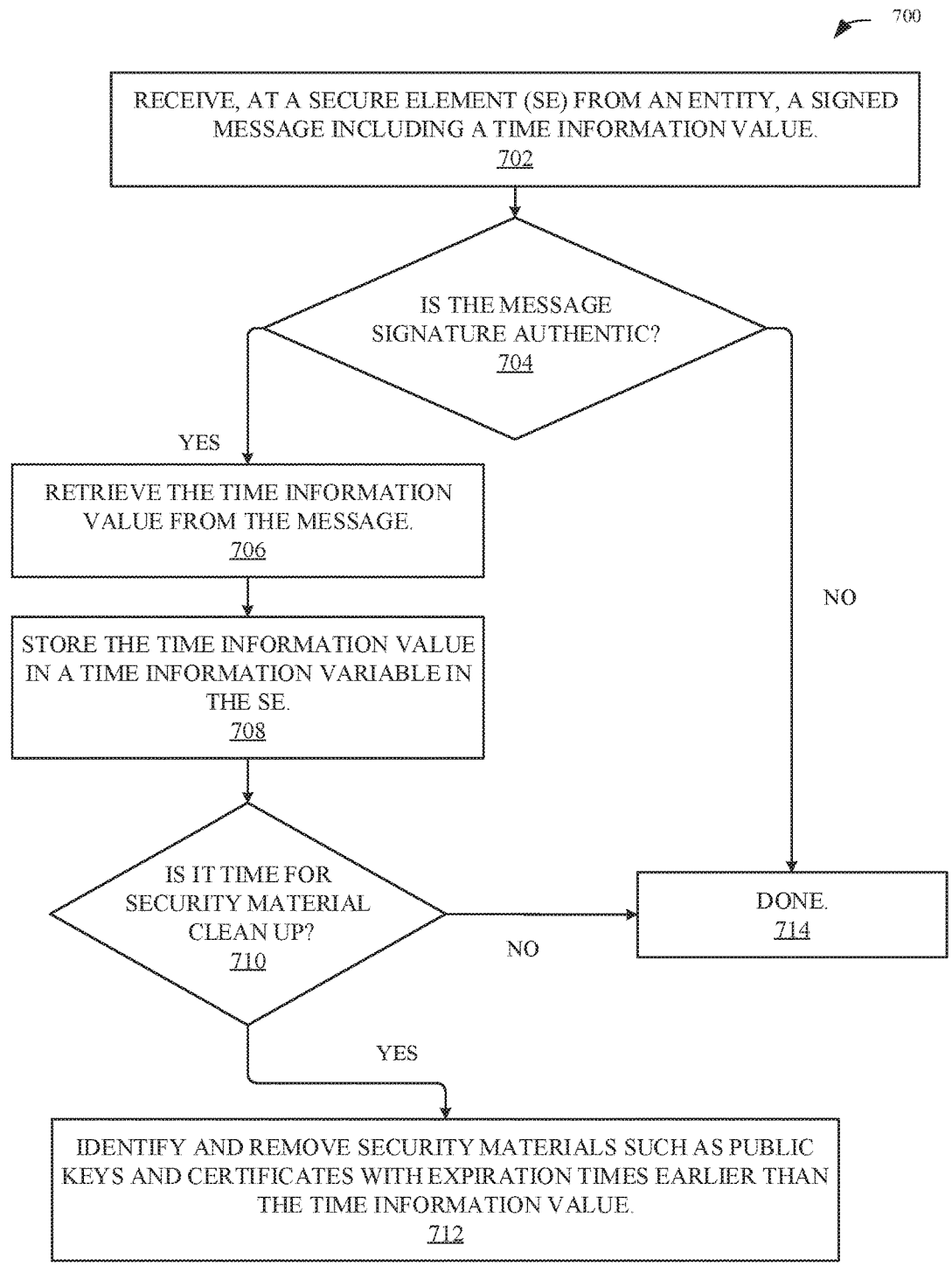
FIG. 7 illustrates exemplary logic for obtaining time information by an SE and performing a cleanup operation, according to some embodiments.

FIG. 7 illustrates exemplary logic 700 for obtaining time information. At 702 an SE receives a signed message including a time information value. At 704, the SE determines whether the message is authentic. If not, the message is ignored as indicated at 714. If the message is authentic, at 706 the SE retrieves or parses a time information value from the message. At 708, the SE stores the time information value in a time information variable in the SE. At 710, the SE determines whether it is time for a cleanup of security materials on the SE. If it is time for a cleanup, at 712 the SE identifies and removes security materials such as public keys and/or certificates whose expiration times are earlier than the time indicated by the time information value.

Logic for Processing a CRL Using Time Information

Figure 8:
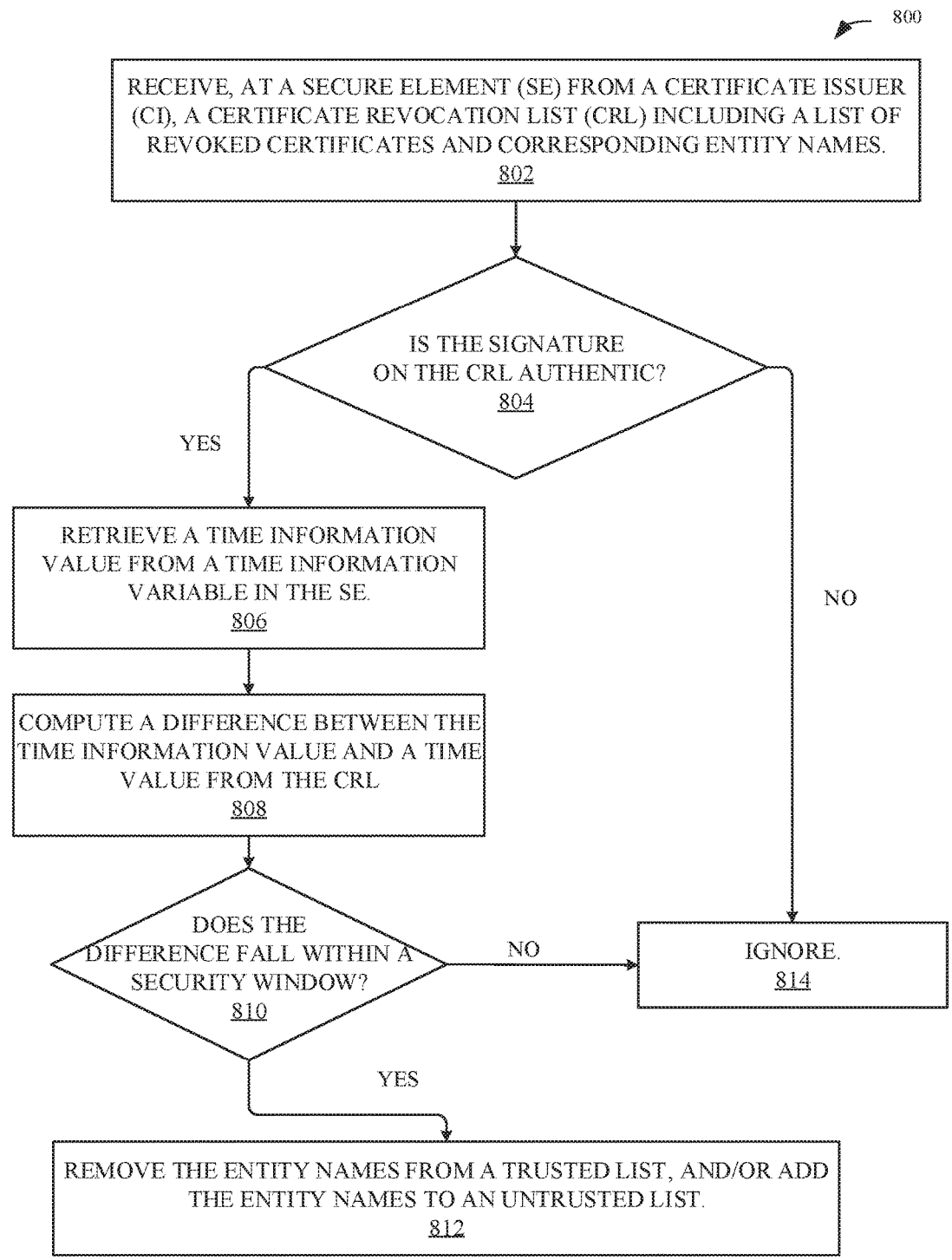
FIG. 8 illustrates exemplary logic for applying time information by an SE, according to some embodiments.

FIG. 8 illustrates exemplary logic 800 for processing a CRL using time information at an SE. At 802, the SE receives from a CI a CRL including a list of user identifies or serial numbers corresponding to revoked certificates. At 804, the SE determines whether the signature on the CRL is authentic. If the signature is not authentic, the CRL is ignored as indicated at 814. If the signature is authentic, the SE retrieves at 806 a time information variable from a time information variable in the SE. At 808 the SE computes a difference between the time information value and a time value parsed or read from the CRL. If the difference falls within a security window at 810, the SE proceeds to process the CRL at 812. At 812, the SE may, for example, remove the entity names found in the CRL from a trusted list and/or add the entity names found in the CRL to an untrusted list.

Some SE Details

Figure 9:
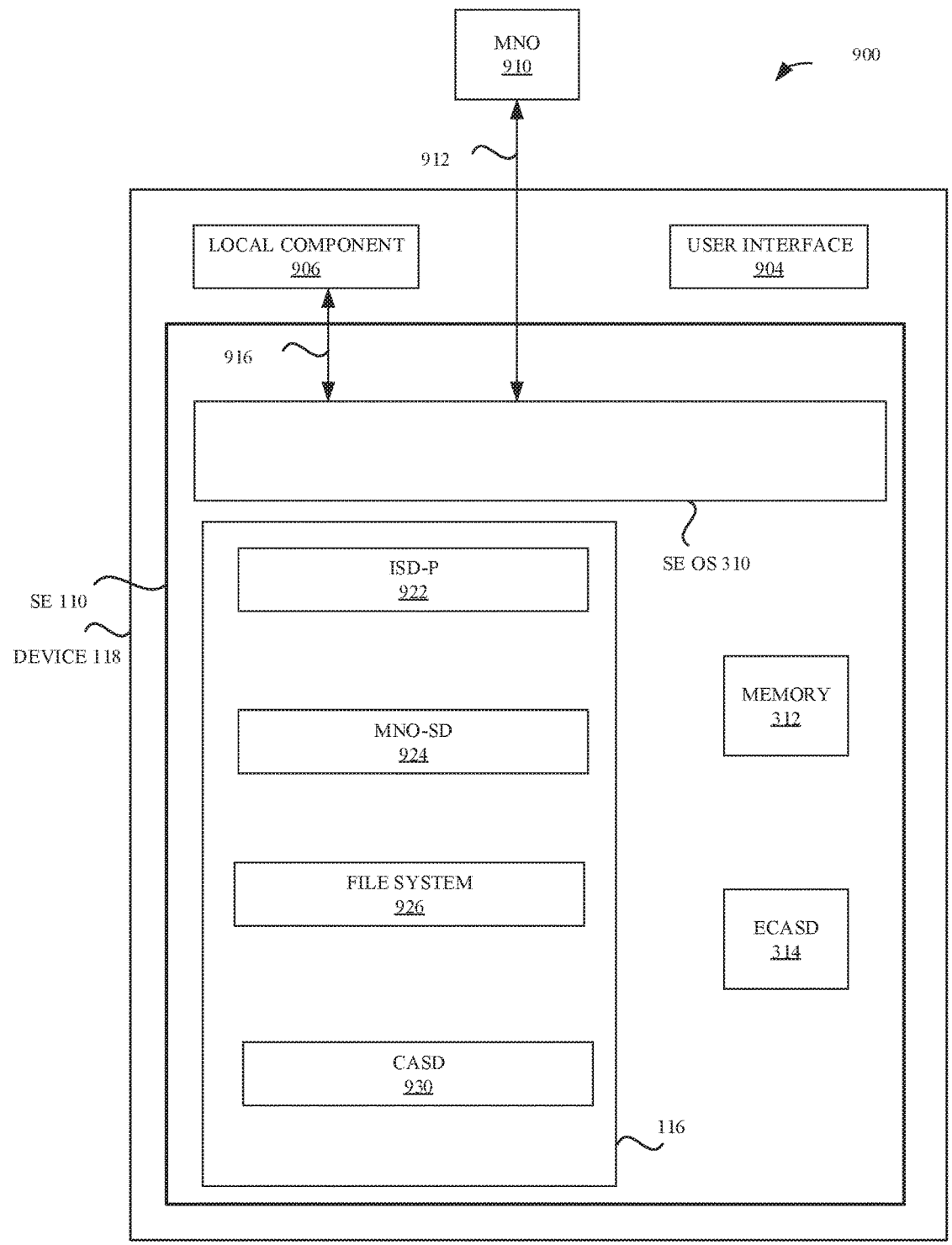
FIG. 9 illustrates exemplary internal features of an SE, according to an eUICC embodiment.

FIG. 9 illustrates some details of the SE 110 in a system 900. In an exemplary embodiment, the SE 110 may be an eUICC. The SE OS 310 may be, for example, in communication with a mobile network operator (MNO) 910. Device 118 can include, for example, a local component 906 in communication with the SE OS 310 over a trusted interface 916. The device 118 can also include, in some embodiments, a user interface 104. The SE 110 can include an eSIM 116. The eSIM 116 can include an ISD-P 922. An ISD-P (issuer security domain —profile) can host a unique profile within an eUICC. The ISD-P is a secure container or security domain for the hosting of the profile. The ISD-P is used for profile download and installation based on a received bound profile package. The eSIM 116 can also include an MNO-SD 924. An MNO-SD is the representative on the SE 110 of an MNO providing services to an end user of the device 118 (for example, MNO 910). The eSIM 116 can also include a file system 926 and a CASD or key store 930. Also illustrated are memory 312 and ECASD 314.

Exemplary Network System

Figure 10:
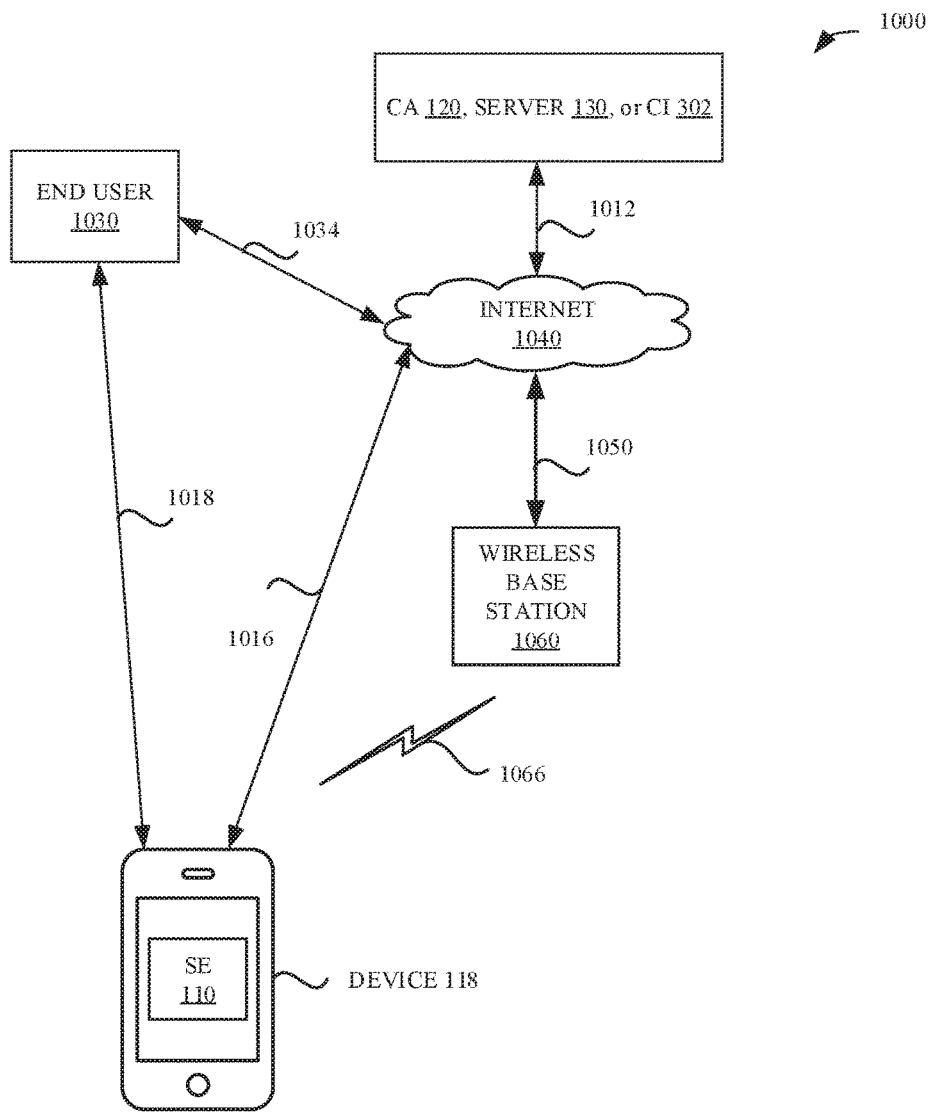
FIG. 10 illustrates an exemplary network system including an SE in a device, according to some embodiments.

FIG. 10 illustrates an exemplary network system 1000. The SE 110 in the device 118 can be in communication with i) an end user 1030 through interface or connection 1018, with ii) the Internet 1040 through a wired connection 1016, and with iii) a wireless base station 1060 through a radio connection 1066. Wireless base station 1060 is able to communicate through the Internet 1040 as shown by connection 1050. The CA 120, the server 130, and/or the CI 302, for example, can communicate with the SE 110 through the Internet 1040.

Representative Exemplary Apparatus

Figure 11:
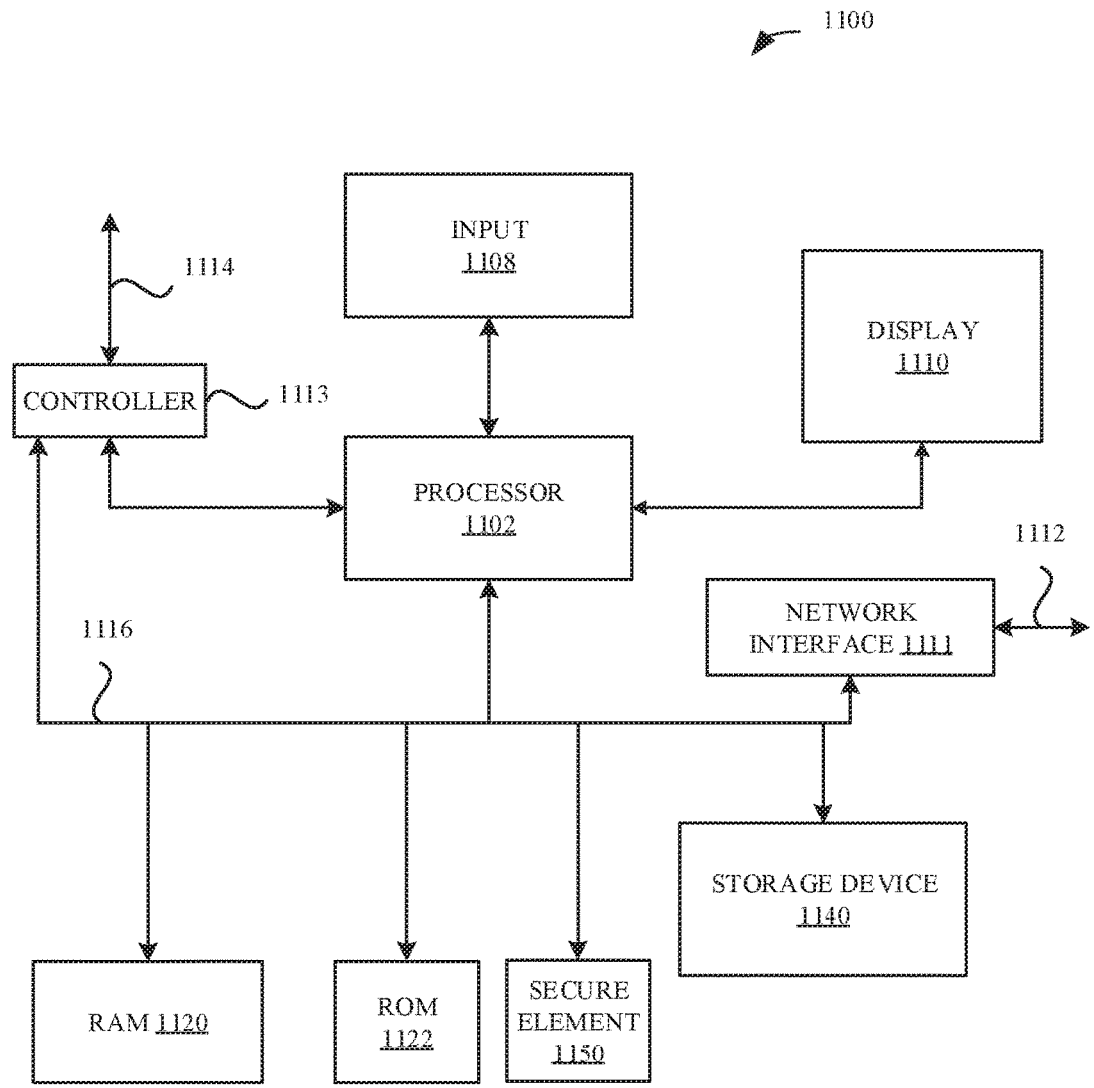
FIG. 11 illustrates an exemplary apparatus for implementation of the embodiments disclosed herein.

FIG. 11 illustrates in block diagram format an exemplary computing device 1100 that can be used to implement the various components and techniques described herein, according to some embodiments. In particular, the detailed view of the exemplary computing device 1100 illustrates various components that can be included in the device 118, the SE 110 and the servers, CAs, and CI illustrated in one or more of FIGS. 1, 3, 4A-4C, 5-6, and 9-10. As shown in FIG. 11, the computing device 1100 can include a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 (screen display) that can be controlled by the processor 1102 to display information to the user (for example, information relating to incoming, outgoing, or active communication session). A data bus 1116 can facilitate data transfer between at least a storage device 1140, the processor 1102, and a controller 1113. The controller 1113 can be used to interface with and control different equipment through an equipment control bus 1114. The computing device 1100 can also include a network/bus interface 1111 that couples to a data link 1112. In the case of a wireless connection, the network/bus interface 1111 can include wireless circuitry, such as a wireless transceiver and/or baseband processor.

The computing device 1100 also includes a storage device 1140, which can include a single storage or a plurality of storages (e.g., hard drives), and includes a storage management module that manages one or more partitions within the storage device 1140. In some embodiments, storage device 1140 can include flash memory, semiconductor (solid state) memory or the like. The computing device 1100 can also include an SE 1150. The computing device 1100 can also include a Random Access Memory ("RAM") 1120 and a Read-Only Memory ("ROM") 1122. The ROM 1122 can store programs, utilities or processes to be executed in a non-volatile manner. The RAM 1120 can provide volatile data storage, and stores instructions related to the operation of the computing device 1100.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
   at a secure element (SE) including a memory:
   receiving, from an entity, a message signed with a public key included in a public key certificate associated with a certification authority (CA) and generated by a trusted certificate issuer (CI), wherein the public key certificate includes an expiration time;
   obtaining a time information value from a time information variable of the memory, wherein the time information value is uniquely associated with a set of one or more CAs associated with the CI and that includes the CA;
   comparing the expiration time with the time information value to produce a comparison result;
   when the comparison result indicates that the expiration time falls outside a security window:
   treating the public key certificate as untrustworthy; and
   when the comparison result indicates that the expiration time does not fall outside a security window:
   processing the message.

2. The method of claim 1, further comprising:
   requesting a time information update from the CA;
   receiving the time information value from the CA; and
   storing the time information value in the time information variable.

3. The method of claim 1, further comprising:
   receiving an unsolicited time information value from the CA; and
   storing the time information value in the time information variable.

4. The method of claim 1, further comprising:
   receiving a signed message from a second entity;
   authenticating the message using a certificate associated with the second entity;
   when the authenticating is successful, obtaining a second time information value from the signed message; and
   storing the second time information value in the time information variable,
   wherein the second entity is one of the set of one or more CAs or the CI.

5. The method of claim 1, wherein treating the public key certificate as untrustworthy includes:
   removing the public key certificate from the memory.

6. The method of claim 1, wherein treating the public key certificate as untrustworthy includes:
   adding an identity of the entity to a list of untrusted entities in the memory.

7. The method of claim 1, wherein treating the public key certificate as untrustworthy includes:
   removing an identity of the entity from a list of trusted entities in the memory.

8. The method of claim 1, further comprising:
   receiving, prior to the receiving the message, the public key certificate; and
   storing the public key certificate in the memory.

9. The method of claim 1, wherein the message includes a certificate revocation list (CRL).

10. The method of claim 9, wherein the CRL includes a server identifier.

11. The method of claim 10, wherein the processing the message includes:
    removing the server identifier from a trusted entities list of the memory.

12. A secure element (SE) comprising:
    a processor; and
    a memory, wherein the memory includes instructions that when executed by the processor cause the SE to perform steps comprising:
    receiving a first epoch value from a first certification authority (CA),
    storing the first epoch value in a second time information variable of the memory,
    receiving, from an entity, a message signed with a public key included in a public key certificate associated with the first CA and generated by a trusted certificate issuer (CI),
    obtaining a time information value from a time information variable of the memory,
    wherein the time information value is uniquely associated with a set of one or more CAs associated with the CI and that includes the first CA
    obtaining a second epoch value from the message,
    when an expiration time falls outside a security window or the first epoch value does not match the second epoch value:
    treating the public key certificate as untrustworthy, and
    when the expiration time falls inside a security window and the first epoch value matches the second epoch value:
    processing the message.

13. The SE of claim 12, wherein the time information value includes the expiration time.

14. The SE of claim 12, wherein the time information value includes a publication time.

15. The SE of claim 12, wherein the time information value includes an online certificate status protocol (OCSP) stapling time.

16. A secure element (SE) comprising:
    a processor; and
    a memory, wherein the memory includes instructions that when executed by the processor cause the SE to perform steps comprising:
    receiving, from an entity, a message signed with a public key included in a public key certificate associated with a certification authority (CA) and generated by a trusted certificate issuer (CI), wherein the public key certificate includes an expiration time;
    obtaining a time information value from a time information variable of the memory, wherein the time information value is uniquely associated with a set of one or more CAs associated with the CI and that includes the CA;
    comparing the expiration time with the time information value to produce a comparison result;
    when the comparison result indicates that the expiration time falls outside a security window:
    treating the public key certificate as untrustworthy; and
    when the comparison result indicates that the expiration time does not fall outside a security window:
    processing the message.

17. The SE of claim 16, wherein the steps performed by the SE further comprise:

receiving a signed message from a second entity;
authenticating the message using a certificate associated with the second entity;
when the authenticating is successful, obtaining a second time information value from the signed message; and
storing the second time information value in the time information variable,
wherein the second entity is one of the set of one or more CAs or the CI.

18. The SE of claim 16, wherein treating the public key certificate as untrustworthy includes:
adding an identity of the entity to a list of untrusted entities in the memory.

19. The SE of claim 16, wherein treating the public key certificate as untrustworthy includes:
removing an identity of the entity from a list of trusted entities in the memory.

20. The SE of claim 16, wherein:
the message includes a certificate revocation list (CRL);
the CRL includes a server identifier; and
the processing the message includes removing the server identifier from a trusted entities list of the memory.

* * * * *